United States Patent
Rached

(10) Patent No.: US 8,070,977 B2
(45) Date of Patent: Dec. 6, 2011

(54) HYDROFLUOROOLEFIN COMPOSITIONS

(75) Inventor: Wissam Rached, Chaponost (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/996,195

(22) PCT Filed: May 14, 2009

(86) PCT No.: PCT/FR2009/050888
§ 371 (c)(1), (2), (4) Date: Dec. 3, 2010

(87) PCT Pub. No.: WO2010/000993
PCT Pub. Date: Jan. 7, 2010

(65) Prior Publication Data
US 2011/0095224 A1    Apr. 28, 2011

(30) Foreign Application Priority Data

Jun. 11, 2008  (FR) ...................................... 08 53859

(51) Int. Cl.
*C09K 5/04* (2006.01)

(52) U.S. Cl. .......................................................... 252/67
(58) Field of Classification Search ...................... 252/67
See application file for complete search history.

(56) References Cited

U.S. PATENT DOCUMENTS

2006/0243944 A1 * 11/2006 Minor et al. ..................... 252/67
2009/0253820 A1 * 10/2009 Bowman et al. ............... 521/170

FOREIGN PATENT DOCUMENTS

| WO | WO 2004/037913 | 5/2004 |
|---|---|---|
| WO | WO 2005/105947 | 11/2005 |
| WO | WO 2006/094303 | 9/2006 |
| WO | WO 2008/009922 | 1/2008 |
| WO | WO 2008/009928 | 1/2008 |

* cited by examiner

*Primary Examiner* — John Hardee
(74) *Attorney, Agent, or Firm* — Steven D. Boyd

(57) ABSTRACT

The present invention relates to compositions containing hydrofluoroolefins and to the uses thereof as heat transfer fluids, blowing agents, solvents and aerosols. More particularly, the invention relates to compositions having: 5 to 65% by weight, preferably from 5 to 15% by weight, of 2,3,3,3-tetrafluoropropene, 5 to 70% by weight, preferably 40 to 60% by weight, of HFC-134a and 25 to 42% by weight of HFC-32.

2 Claims, No Drawings

HYDROFLUOROOLEFIN COMPOSITIONS

FIELD OF THE INVENTION

The present invention relates to compositions including hydrofluoroolefins and to their uses as heat transfer fluids, blowing agents, solvents and aerosols.

BACKGROUND OF THE INVENTION

The problems posed by substances which deplete the atmospheric ozone layer (ODP: ozone depletion potential) were treated at Montreal, where the protocol imposing a reduction on the production and use of chlorofluorocarbons (CFCs) was signed. This protocol has formed the subject of amendments which have required that CFCs be withdrawn and have extended regulatory control to other products, including hydrochlorofluorocarbons (HCFCs).

The refrigeration industry and that for the production of air conditioning have invested a great deal in the replacement of these refrigerants and thus it is that hydrofluorocarbons (HFCs) have been marketed.

The (hydro)chlorofluorocarbons used as blowing agents or solvents have also been replaced by HFCs.

In the motor vehicle industry, the air conditioning systems for vehicles sold in many countries have changed from a chlorofluorocarbon (CFC-12) refrigerant to a hydrofluorocarbon (1,1,1,2-tetrafluoroethane: HFC-134a) refrigerant which is less harmful to the ozone layer. However, from the viewpoint of the objectives set by the Kyoto protocol, HFC-134a (GWP=1300) is regarded as having a high heating power. The contribution to the greenhouse effect of a refrigerant is quantified by a criterion, the GWP (Global Warming Potential), which epitomizes the heating power, a reference value of 1 being taken for carbon dioxide.

As carbon dioxide is non-toxic and non-flammable and has a very low GWP, it has been proposed as refrigerant for air conditioning systems as a replacement for HFC-134a. However, there are several disadvantages to the use of carbon dioxide, related in particular to the very high pressure of the use thereof as coolant in existing devices and technologies.

The document WO 2004/037913 discloses the use of compositions comprising at least one fluoroalkene having three or four carbon atoms, in particular pentafluoropropene and tetrafluoropropene, preferably having a GWP at most of 150, as heat transfer fluids.

The document WO 2005/105947 teaches the addition to the tetrafluoropropene, preferably 1,3,3,3-tetrafluoropropene, of a coblowing agent, such as difluoromethane, pentafluoroethane, tetrafluoroethane, difluoroethane, heptafluoropropane, hexafluoropropane, pentafluoropropane, pentafluorobutane, water and carbon dioxide.

The document WO 2006/094303 discloses binary compositions of 2,3,3,3-tetrafluoropropene (1234yf) with difluoromethane (HFC-32) and of 2,3,3,3-tetrafluoropropene with 1,1,1,2-tetrafluoroethane (HFC-134a).

Quaternary mixtures comprising 1,1,1,2,3-pentafluoropropene (1225ye) in combination with difluoromethane, 2,3,3,3-tetrafluoropropene and HFC-134a were disclosed in this document. However, 1,1,1,2,3-pentafluoropropene is toxic.

Quaternary mixtures comprising 2,3,3,3-tetrafluoropropene in combination with iodotrifluoromethane ($CF_3I$), HFC-32 and HFC-134a were also disclosed in the document WO 2006/094303. However, $CF_3I$ has a non-zero ODP and presents problems of stability and corrosion.

DETAILED DESCRIPTION OF THE INVENTION

The Applicant Company has now developed compositions including hydrofluoropropenes which do not exhibit the abovementioned disadvantages and which have both a zero ODP and a lower GWP than that of existing heat transfer fluids, such as R404A (ternary mixture of pentafluoroethane (44% by weight), trifluoroethane (52% by weight) and HFC-134a (4% by weight)) and R407C (ternary mixture of HFC-134a (52% by weight), HFC-125 (25% by weight) and HFC-32 (23% by weight)).

The compositions according to the present invention are characterized in that they comprise from 5 to 65% by weight, preferably from 5 to 15% by weight, of 2,3,3,3-tetrafluoropropene, from 5 to 70% by weight, preferably from 40 to 60% by weight, of HFC-134a and from 25 to 42% by weight of HFC-32.

According to a preferred form of the invention, the compositions comprise from 25 to 42% by weight of HFC-32, from 30 to 55% by weight of 2,3,3,3-tetrafluoropropene and from 20 to 35% by weight of HFC-134a.

The compositions comprising 40% by weight of HFC-32, 10% by weight of 2,3,3,3-tetrafluoropropene and 50% by weight of HFC-134a are particularly advantageous.

The compositions comprising 40% by weight of HFC-32, 40% by weight of 2,3,3,3-tetrafluoropropene and 20% by weight of HFC-134a are also advantageous.

Advantageously, the compositions according to the present invention essentially comprise 2,3,3,3-tetrafluoropropene, HFC-134a and HFC-32 as hydrofluorocarbons (saturated or unsaturated).

The compositions according to the present invention can be used as heat transfer fluids, preferably in compression systems. They are particularly suitable for refrigeration, preferably as replacement for R404A and HCFC-22 (chlorodifluoromethane).

The compositions according to the present invention are also suitable for compression systems for air conditioning and heating, in particular heat pumps, preferably as replacement for R407C and HFC-134a.

The compositions according to the present invention can comprise a stabilizer for 2,3,3,3-tetrafluoropropene. The stabilizer represents at most 5% by weight, with respect to the total composition.

Mention may in particular be made, as stabilizers, of nitromethane, ascorbic acid, terephthalic acid, azoles, such as tolutriazole or benzotriazole, phenolic compounds, such as tocopherol, hydroquinone, t-butylhydroquinone or 2,6-di(tert-butyl)-4-methylphenol, epoxides (alkyl, optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphates, phosphonates or thiols and lactones.

The compositions according to the present invention can comprise lubricating agents, such as mineral oil, alkylbenzene, polyalkylene glycol and polyvinyl ether.

The compositions according to the present invention can additionally be used as blowing agents, aerosols and solvents.

Experimental Part

The performances of the compositions according to the invention in refrigeration are given in Table 1. The values of the constituents (1234yf/32/134a) for each composition are given as percentage by weight.

The parameters such as the coefficient of performance (COP), the volumetric capacity (Capacity) and the high pressure (Cond P) are determining, when replacement with existing equipment is concerned. For R404A, the nominal operating pressure is 1829 kPa, the capacity is 1471 kJ/$m^3$ and the COP is 1.8 under the following operating conditions:

| | |
|---|---|
| Evaporation temperature: | −20° C. |
| Condensation temperature: | 40° C. |
| Compressor inlet temperature: | −5° C. |
| Temperature of the subcooled liquid: | 35° C. |
| Isentropic efficiency of the compressor: | 70% |

Evap P: pressure in the evaporator

Cond P: pressure in the condenser

Ratio: the compression ratio

T comp outlet: temperature at the compressor outlet

COP: coefficient of performance and is defined, where refrigeration is concerned, as being the ratio of the useful cold power supplied by the system to the power introduced or consumed by the system.

The compositions according to the present invention have, under the same operating conditions as R404A, a volumetric capacity and a COP which are equivalent to or even greater than the values obtained with R404A.

TABLE 1

| Compositions | | | Evap P (kPa) | Cond P (kPa) | Ratio (w/w) | T comp outlet | Capacity (kJ/m³) | COP |
|---|---|---|---|---|---|---|---|---|
| R404A | | | 300 | 1829.00 | 6.10 | 76 | 1471 | 1.8 |
| 1234yf | 134a | 32 | | | | | | |
| 10 | 50 | 40 | 226 | 1847 | 8.17 | 119 | 1426 | 1.9 |
| 20 | 40 | 40 | 236 | 1894 | 8.02 | 117 | 1457 | 1.8 |
| 30 | 30 | 40 | 247 | 1940 | 7.87 | 115 | 1490 | 1.8 |
| 40 | 20 | 40 | 257 | 1984 | 7.72 | 113 | 1522 | 1.8 |

The performances of the compositions according to the present invention in air conditioning and heat pump operating conditions are given in Table 2. The values of the constituents (1234yf/32/134a) for each composition are given as percentage by weight.

For R407C, the nominal operating pressure is 3442 kPa, the volumetric capacity is 1461 kJ/m³ and the COP is 2.1 under the following operating conditions:

| | |
|---|---|
| Evaporation temperature: | −5° C. |
| Condensation temperature: | 70° C. |
| Compressor inlet temperature: | 5° C. |
| Temperature of the subcooled liquid: | 65° C. |
| Isentropic efficiency of the compressor: | 70% |

Evap P: pressure in the evaporator

Cond P: pressure in the condenser

Ratio: the compression ratio

T comp outlet: temperature at the compressor outlet

COP: coefficient of performance and is defined, where a heat pump is concerned, as being the ratio of the useful hot power supplied by the system to the power introduced or consumed by the system.

Under the same conditions, the compositions according to the present invention provide a greater capacity than the capacity of R407C and make possible the use of devices which are smaller in size, a reduction in the amount of the refrigerant to be employed and also a reduction in the cost of the device.

TABLE 2

| Compositions | | | Evap P (kPa) | Cond P (kPa) | Ratio (w/w) | T comp outlet | Capacity (kJ/m³) | COP |
|---|---|---|---|---|---|---|---|---|
| R407C | | | 385.68 | 3442 | 8.93 | 126.60 | 1461 | 2.1 |
| 1234yf | 134a | 32 | | | | | | |
| 60 | 0 | 40 | 478 | 3971 | 8 | 133 | 1503 | 1.9 |
| 10 | 50 | 40 | 408.43 | 3635 | 8.90 | 141.28 | 1671 | 2.2 |
| 20 | 40 | 40 | 424.91 | 3704 | 8.72 | 139.08 | 1655 | 2.1 |
| 30 | 30 | 40 | 441.27 | 3771 | 8.55 | 137.06 | 1635 | 2.1 |
| 40 | 20 | 40 | 456.56 | 3838 | 8.41 | 135.37 | 1607 | 2.1 |

The invention claimed is:

1. A composition characterized in that it comprises 40% by weight of HFC-32, 10% by weight of 2,3,3,3-tetrafluoropropene and 50% by weight of HFC-134a.

2. A composition characterized in that it comprises 40% by weight of HFC-32, 40% by weight of 2,3,3,3-tetrafluoropropene and 20% by weight of HFC-134a.

\* \* \* \* \*